July 27, 1937.  H. DÖHLE  2,087,903

TELEPHONE PAYSTATION CIRCUIT

Filed April 27, 1935

INVENTOR.
HINRICH DOHLE
BY
ATTORNEY

Patented July 27, 1937

2,087,903

UNITED STATES PATENT OFFICE 2,087,903

TELEPHONE PAYSTATION CIRCUIT

Hinrich Döhle, Berlin, Germany, assignor to Telephon-Apparat Fabrik E. Zwietusch & Co., G. m. b. H., Berlin-Charlottenburg, Germany Application April 27, 1935, Serial No. 18,563
In Germany May 9, 1934

12 Claims. (Cl. 179—6.3)

The invention relates to a circuit arrangement for paystations in which the collection of the inserted fee takes place at the end of the conversation by means of a collecting magnet, or the return of the fee is brought about if the connection at the exchange is not subject to a fee.

Known arrangement of this kind necessitates, at the exchange, a transmission over several relays as well as a reversal of the speaking leads in order to energize the locking magnet in the paystation and maintain it energized until, in the case of connections which are subject to a fee, the collecting magnet has been enabled to energize positively and thereby has collected a deposited fee. By the invention it is possible to avoid a reversal of the speaking leads at the exchange and to reduce the number of the relays necessary for the transmission of the collecting impulse to the paystation, to one. The locking magnet, which controls on the one hand the disconnection of the exchange loop and on the other hand the connection of the collecting magnet to the line, is caused to be energized, on the hanging up of the receiver, by the charging current of a high capacity condenser connected in series with the magnet across the speaking leads. In the case of connections which are not subject to a fee the magnet is held until the condenser is charged, or in the case of connections subject to a fee, until the charge impulse from the exchange has energized the collecting magnet and the charging relay has again deenergized.

Figure 1:
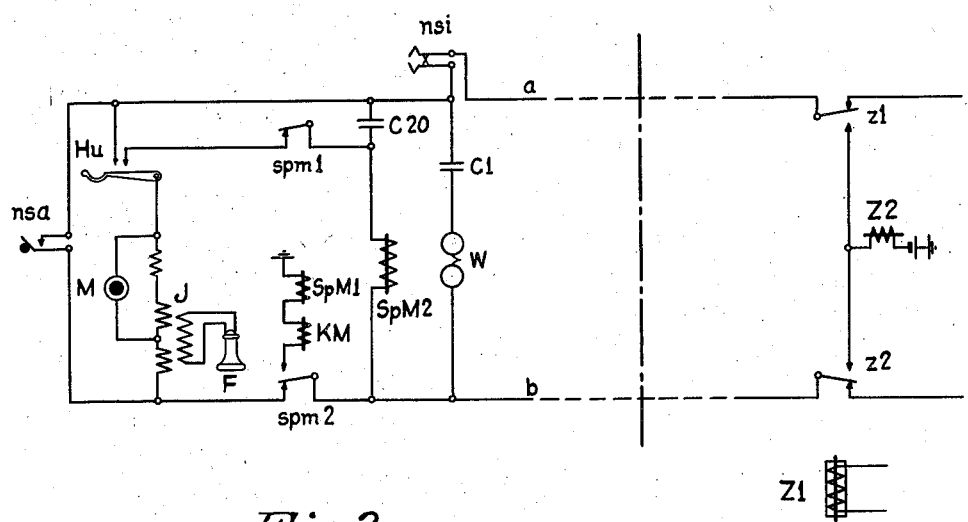
Figure 2:
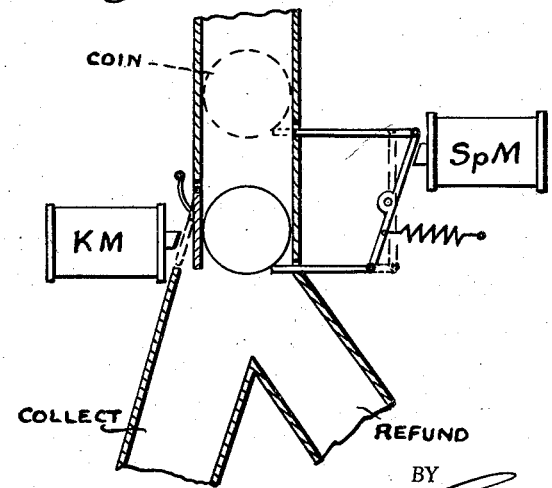

The invention will be explained with reference to the accompanying schematic drawing in which Fig. 1 illustrates the circuits and Fig. 2 illustrates the coin collect and refund mechanism, the reference characters in the diagrams have the following meaning:

nsa are the dial switch off normal contacts, nsi impulse contacts, HU the switchhook, M microphone, J, induction coil, F receiver, W bell, CI condenser (about 1-mf.), C20 condenser (about 20 mf.), SpMl and SpM2 windings of the locking magnet, KM collecting magnet, Zl and Z2 windings of the charging relay in the exchange.

The setting up of the connection and the ensuing conversation take place in known manner and will not be described as they do not form part of the invention. At the end of a connection for which a fee has to be charged the receiver F is hung up, and the switchhook HU opens so that a charging current now flows over the exchange loop to the condenser C20 as follows: battery in the exchange (not shown) a-lead, nsi, C20, winding SpM2, b-lead, to ground in the exchange (not shown).

The charging current for the condenser C20 causes the locking magnet SpM to be operated over winding SpM2 so that the contacts spm1 and spm2 are operated. The contact spm1 opens a second point in the short circuit about the condenser C20. This is done so that in case the receiver is removed to again close the switchhook springs HU the energization of the winding SpM will not be prevented. The contact spm2 at its back contact opens the subscriber's loop circuit while at the front contact it connects the upper winding SpM1 and the collect magnet KM to the b-lead. If the winding Z1 of the charging relay of the group selector is now energized it operates and connects battery to both sides of the line of the paystation at its contacts z1 and z2 and this holds the locking magnet energized over its own contact spm2 and winding SpM1. This circuit is traced as follows: battery in the collecting transmission arrangement, resistance of the winding Z2, contact z2, b-lead, contact spm2, collecting magnet KM, locking winding of the locking magnet SpM1, to earth. The collecting magnet KM is energized and effects the collection of the fee.

It should be mentioned that winding Z1 of the charge relay is only energized at the release of a connection and then only in case the desired connection has been completed. The charge relay, through its Z1 winding, operates in a manner similar to that disclosed and described for the meter relay ZR in the Langer Patent 1,505,715, issued August 19, 1924. In this patent the meter relay ZR operates after both parties replace their receivers and controls the release of the switch train on completed connections. Winding Z1 of the charge relay takes the place of the meter relay ZR of the above mentioned patent and when this winding is energized in response to both parties replacing their receivers, contacts z1 and z2 are operated to connect battery through the second winding Z2 of the charge relay to the a and b leads as previously described.

The charge relay, through its winding Z1, is only momentarily operated after both subscribers have replaced their receivers for the time interval equal to the release time of a slow-to-release relay, such as relay V in the above mentioned patent.

When the charge relay releases the collecting magnet KM also falls away as well as the locking magnet SpM. In the exchange contacts z1 and z2 disconnect the battery from the line leading to the paystation. If the connection was not completed and therefore not subject to a fee the locking magnet SpM is energized as before by the charging current through the condenser C20. The collecting magnet KM, however, is not energized because at the exchange no battery is connected to the b-lead since the charge relay is not energized and has not connected battery through its winding Z2.

When the coin is first deposited in the coin chute, the coin is stopped in the dotted position shown in Fig. 2 by the upper arm of locking magnet SpM. Locking magnet SpM, upon operating, causes the coin to drop to the position shown in full where it is held by the lower arm of the locking magnet until the collect magnet KM is energized or until the locking magnet SpM deenergizes. In case both the locking magnet SpM and the collect magnet KM are energized, the coin is collected, but if the collect magnet is not operated then the coin is refunded upon deenergization of the locking magnet.

It is to be understood that the impedance and resistance relation between the bridge across the line including the switchhook contacts, the contact spm1 and the winding SpM2, and the bridge including the switchhook contacts HU and the speaking apparatus including the windings of the induction coil J and contacts spm2, is such that the winding SpM2 when its bridge is in parallel with the bridge including the induction coil J, will not be sufficiently energized to operate its springs spm1 and spm2. In other words, the impedance and resistance of the winding SpM2 is relatively high in relation to the impedance and resistance of the talking bridge including the induction coil J.

Having described the invention, what is considered to be new and is desired to be protected by Letters Patent will be set forth in the following claims.

What is claimed is:

1. In a paystation telephone circuit in which a deposited fee is collected at the end of a connection and in which the fee is returned on a connection which is not to be paid for, a high capacity condenser, a locking magnet and a collecting magnet, a circuit rendered effective by the replacement of the telephone receiver for charging said condenser to energize said locking magnet, means responsive to the operation of said locking magnet for connecting said collecting magnet to the exchange line, and a circuit for operating said collect magnet to collect the deposited fee.

2. In a paystation telephone line connected to an exchange in which a deposited fee is collected or refunded at the end of a telephone connection, a condenser and a locking relay connected in series across said line at the telephone, a collect magnet controlled by said locking relay, a circuit rendered effective by the restoration of the telephone receiver for charging said condenser to energize said locking relay and connect said collect magnet to the line, and a circuit for operating said collect magnet to collect the deposited fee.

3. In a paystation telephone line connected to an exchange, a condenser and a locking relay connected to said line, a collect magnet controlled by the operation of said locking relay, a circuit rendered effective by the restoration of the telephone receiver for charging said condenser to capacity to energize said locking relay and connect said collect magnet to the line, and a circuit for operating said collect magnet over the line in case a deposited fee is to be collected.

4. In a paystation telephone line connecting with an exchange in which a fee is collected or refunded at the end of a conversation, a condenser and a locking relay connected across the line at the paystation, a collect magnet controlled by said locking relay, a circuit rendered effective by the restoration of the telephone receiver for causing a current from the exchange over the line to charge said condenser and thereby energize said locking relay, said locking relay connecting said collect magnet to said line, means at said exchange for determining whether said fee is to be collected or refunded, and a circuit controlled by said last means for operating said collect magnet over the line from the exchange.

5. In a paystation telephone line connected to an exchange in which a fee is collected or refunded at the end of a conversation, a condenser and a locking relay connected across the line at the telephone, a shunt circuit for said condenser, means responsive to the removal of the telephone receiver for closing said shunt circuit, the restoration of the telephone receiver after conversation opening said shunt circuit to cause current from the exchange over the line to charge said condenser and to thereby operate said locking magnet, a collecting magnet connected to the line by the operation of said locking relay, and a circuit for operating said collect magnet over said connection and line.

6. In a paystation telephone circuit including a line connected to an exchange and in which a deposited fee is either collected or refunded upon the termination of a connection, a condenser and a locking relay connected to said line at the telephone, a circuit rendered effective by the termination of a connection from the telephone for charging said condenser thereby operating said locking relay over a loop circuit from said exchange, a collect magnet thereby connected to the line, and a circuit completed dependent upon whether the deposited fee is to be collected for operating said collect magnet over one side of the line circuit.

7. In a paystation telephone circuit including a line connected to the exchange and in which a deposited fee is either collected or refunded at the termination of a connection, a condenser and a two winding locking relay, one of said locking relay windings and said condenser connected to said line, a circuit rendered effective by the termination of the telephone connection for charging said condenser through said one winding of the locking relay to operate the relay, a collecting magnet connected to the other winding of said locking relay, said collecting magnet and said other winding connected to said line circuit responsive to the operation of said locking relay, and a circuit completed for operating said collecting magnet over said last connection in case the fee is to be collected.

8. In a paystation telephone line in which a deposited coin is collected or refunded at the end of a telephone connection, a condenser, a circuit for charging said condenser rendered effective by the replacement of the receiver at the end of a telephone connection, a locking relay energized in responsive to the charging of said condenser, a collect magnet for collecting the deposited coin, and means for connecting said collect magnet to said line in response to the energization of said relay.

9. In a paystation telephone line in which a deposited coin is collected or refunded at the end of a telephone connection, a condenser, a circuit for charging said condenser rendered effective by the replacement of the receiver at the end of a telephone connection, a locking relay energized in response to the charging of said condenser, a collect magnet for collecting the deposited coin, means for connecting said collect magnet to said line in response to the energization of said relay, and means for operating said collect magnet over said connection only in case the coin is to be collected.

10. In a paystation telephone line in which a deposited coin is collected or refunded at the end of a telephone connection, a condenser, a locking magnet connected in series with said condenser and in bridge of said line, a shunt circuit for said condenser, switchhook contacts for closing said shunt circuit in response to the removal of the receiver, a talking circuit for shunting said magnet also closed by said switchhook contacts whereby said magnet is unoperated during conversation, a source of current for charging said condenser when the receiver is replaced and the shunt and talking circuits are opened by the switchhook contacts, said locking magnet operated responsive to the charging of said condenser, a collect magnet, and contacts on said locking magnet for connecting said collect magnet to one of the line conductors.

11. In a paystation telephone line in which a deposited coin is collected or refunded at the end of a telephone connection, a condenser, a locking magnet connected in series with said condenser and in bridge of said line, a shunt circuit for said condenser, switchhook contacts for closing said shunt circuit in response to the removal of the receiver, a talking circuit for shunting said magnet also closed by said switchhook contacts whereby said magnet is unoperated during conversation, a source of current for charging said condenser when the receiver is replaced and the shunt and talking circuits are opened by the switchhook contacts, said locking magnet operated responsive to the charging of said condenser, a collect magnet, contacts on said locking magnet for connecting said collect magnet to one of the line conductors, and normally closed contacts operated by said locking magnet for opening a point in the shunt circuit to prevent closure thereof in case said switchhook contacts are reclosed during the collect or refund period.

12. In a paystation telephone line in which a deposited coin is collected or refunded at the end of a telephone connection, a condenser, a shunt circuit for said condenser, switchhook contacts for closing said shunt circuit in response to the removal of the telephone receiver, a source of current for charging said condenser when the receiver is replaced and the shunt circuit is opened by the switchhook contacts, a locking magnet operated responsive to the charging of said condenser, a collect magnet connected to one line conductor responsive to the operation of said locking magnet, and normally closed contacts operated by said locking magnet for opening said shunt circuit to prevent closure thereof in case said switchhook contacts are reclosed during the collect or refund period.

HINRICH DÖHLE.